(No Model.)
J. W. MAYBERRY.
STUMP PULLER.
No. 330,994. Patented Nov. 24, 1885.
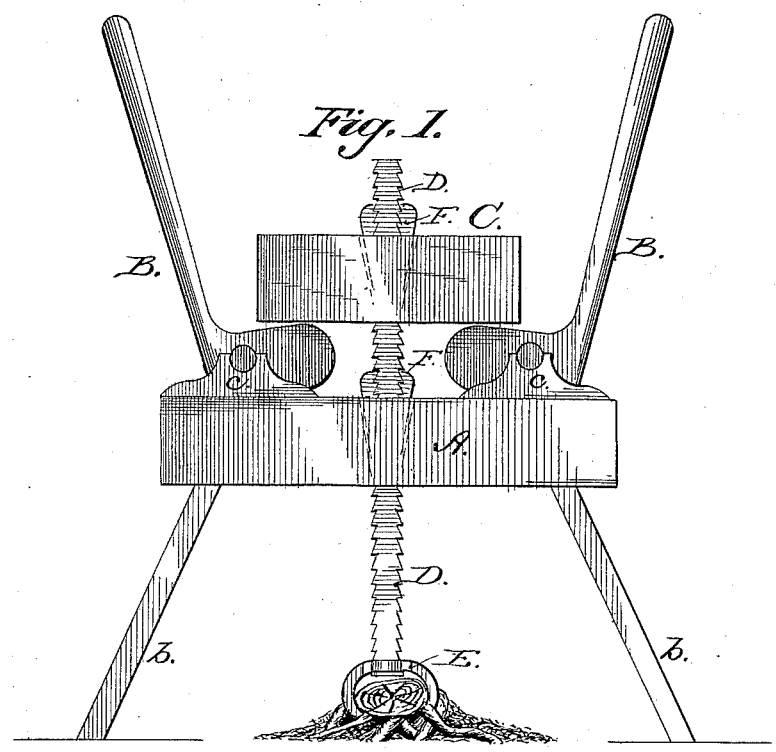
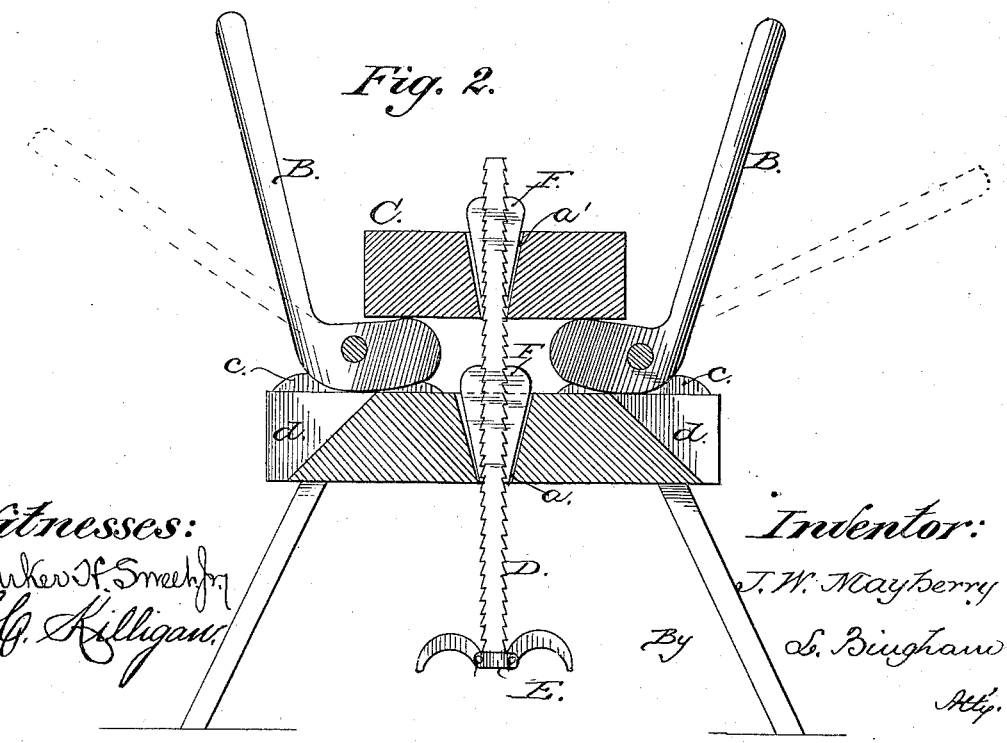
Witnesses:
Parker H. Smith
J. G. Killigan
Inventor:
J. W. Mayberry
By L. Bingham
Atty.

UNITED STATES PATENT OFFICE.

JAMES W. MAYBERRY, OF MARVYN, ALABAMA.

STUMP-PULLER.

SPECIFICATION forming part of Letters Patent No. 330,994, dated November 24, 1885.

Application filed October 1, 1885. Serial No. 178,694. (No model.)

*To all whom it may concern:*

Be it known that I, JAMES W. MAYBERRY, of Marvyn, in the county of Russell and State of Alabama, have invented certain new and useful Improvements in Stump-Pullers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has for its object to provide a stump puller or extractor of a novel, simplified, and inexpensive construction, whereby roots or stumps of trees may be readily and effectively drawn out of the ground in the simplest and best possible manner without the aid of skilled labor; and the features of novelty of my invention consist, essentially, in the details of construction and general arrangement of parts, all as will be hereinafter fully described, and pointed out in the claims.

In the accompanying drawings, Figure 1 represents a front elevation of my complete invention, and Fig. 2 a detail sectional view thereof.

Similar letters of reference indicate like parts in both figures.

Referring to the drawings, A represents the main frame of my improved device, which is composed of a rectangular-shaped block having a central wedge-shaped opening, $a$, and provided at each end with high legs or supports $b$, as fully shown in Fig. 1. Upon each upper end of the said rectangular block are provided brackets or bearings $c$, for the reception of the journals of the cam-shaped ends of the levers B, a suitable inclined groove, $d$, being formed in both ends of the rectangular block for the free movement therein of the cam-shaped ends of said levers.

C represents an auxiliary block corresponding in size and shape to that of the lower main block, and being also provided with a central wedge-shaped opening, $a'$, as shown.

D represents a vertical rack-bar adapted to project up through the center of the wedge-shaped openings $a\ a'$, and provided at its base with suitable tongs or dogs, E, for gripping the roots or stumps of trees. The teeth or notches of said rack-bar are preferably sharp and project slightly downward.

F represents wedge-shaped blocks, provided on one face thereof with sharp teeth or notches projecting in an opposite direction to those upon the rack-bar, said blocks being designed to fit within the wedge-shaped openings $a\ a'$, one on each side of the rack-bar D, as fully shown in the drawings.

In the operation of my invention the apparatus is first adjusted in position over the root or stump to be drawn out of the ground, flat boards or blocks being placed beneath the legs or supports $b$, to prevent them from sinking into the ground. The tongs or dogs E of the rack-bar D are then adjusted firmly in position upon the root or stump, the handles of the levers B being in a raised or vertical position, and the auxiliary block C resting upon the ends of said levers. The wedge-shaped blocks F are then dropped into their places in the central wedge-shaped openings $a\ a'$ upon each side of the rack-bar D. Now, as the levers B are drawn downward, their cam-shaped ends force the auxiliary block C upward, and with it the rack-bar D, which operation pulls the root or stump up a short distance, the wedges in the auxiliary block C rigidly engaging with the teeth of the rack-bar until the levers B are drawn down to their full extent, while the wedges in the lower block play loosely in their recesses as the rack-bar moves upward. As the levers B are again raised to their former vertical position, the wedges in the lower block rigidly engage with the teeth of the rack-bar to hold it in position, while the auxiliary block C and its wedges move downward upon said rack-bar to engage for successive operations for raising said rack-bar, and with it the root or stump, until the latter is drawn completely out of the ground.

The operation of the apparatus is automatic in its action, it being only necessary to alternately raise and depress the handles of the levers until the rack-bar has attained a sufficient height to draw the root or stump from the ground.

Having thus described my invention, I claim as new and useful—

1. The herein-described device for extracting roots or stumps of trees, consisting of the main frame A, having legs or supports $b$ and central opening, $a$, and provided with the auxiliary block C, having central opening, $a'$, cam-levers B, rack-bar D, having gripping-tongs E, and the toothed wedges F, all co-operating substantially as and for the purpose specified.

2. In a stump-puller, the main frame A, having suitable legs or supports, $b$, central wedge-shaped opening, $a$, inclined grooves $d$, and bearings $c$, in combination with the rack-bar D, having gripping-tongs E, cam-levers B, auxiliary block C, and wedges F, substantially as and for the purpose specified.

In testimony that I claim the foregoing as my own I affix my signature in presence of two witnesses.

JAMES W. MAYBERRY.

Witnesses:
J. W. RICE,
A. D. SIMMONS.